Sept. 9, 1958 R. L. DOERRFELD ET AL 2,851,516

STATION SELECTOR

Filed May 13, 1954 5 Sheets-Sheet 1

INVENTORS
ROBERT L. DOERRFELD
DONALD E. HUFFMAN

BY Emery Robinson
ATTORNEY

INVENTORS
ROBERT L. DOERRFELD
DONALD E. HUFFMAN
BY Emery Robinson
ATTORNEY

Sept. 9, 1958 R. L. DOERRFELD ET AL 2,851,516

STATION SELECTOR

Filed May 13, 1954 5 Sheets-Sheet 3

INVENTORS
ROBERT L. DOERRFELD
DONALD E. HUFFMAN

BY Emery Robinson
ATTORNEY

Sept. 9, 1958 R. L. DOERRFELD ET AL 2,851,516

STATION SELECTOR

Filed May 13, 1954 5 Sheets-Sheet 4

INVENTORS
ROBERT L. DOERRFELD
DONALD E. HUFFMAN

BY Emery Robinson
ATTORNEY

Sept. 9, 1958 R. L. DOERRFELD ET AL 2,851,516

STATION SELECTOR

Filed May 13, 1954 5 Sheets-Sheet 5

INVENTORS
ROBERT L. DOERRFELD
DONALD E. HUFFMAN
BY Emery Robinson
ATTORNEY

United States Patent Office 2,851,516

Patented Sept. 9, 1958

2,851,516

STATION SELECTOR

Robert L. Doerrfeld, Bellwood, and Donald E. Huffman, Chicago, Ill., assignors to Teletype Corporation, Chicago, Ill., a corporation of Delaware Application May 13, 1954, Serial No. 429,552

4 Claims. (Cl. 178—2)

This invention relates to selecting devices and more particularly to a device utilized to select one or more stations of a network of communication stations having printing telegraph apparatus by conditioning certain stations thereof for operation and disabling the balance.

In the communication field, particularly that segment thereof which utilizes printing telegraph apparatus, it is frequently desirable to select by conditioning for operation certain remotely located apparatuses and to reject the balance of the apparatuses by rendering the remainder inoperative where all the apparatuses compose a system and are selectable from any point in the system.

Accordingly, it is an object of this invention to provide a means for conditioning a remote printing telegraph apparatus for the reception of intelligence.

It is another object of this invention to provide a means for disabling a printing telegraph apparatus by suppressing the printing and spacing functions thereof.

It is a further object of this invention to provide a means to control locally and selectively the operative or inoperative condition of a plurality of remotely located printing telegraph apparatuses.

An apparatus embodying the principles of the invention may include a group of slidably mounted push rods having notches formed therein and settable permutatively, a corresponding group of pivotally mounted bars having removable coded wards mounted thereon and disposed transversely of said push rods, said coded wards being engageable with said notches, means for cyclically pivoting said bars in the direction of the push rods, means for permutatively positioning the push rods so as to permit the wards of particular bars to engage corresponding notches as the bars are pivoted towards said push rods thereby selecting the bars, and means actuated by the sequential selection of said bars for conditioning said apparatus for operation and for disabling said apparatus.

Other objects and advantages of the invention will become apparent from the following detailed description of a specific embodiment of the invention when read in conjunction with the accompanying drawings wherein.

Figures 1, 2:
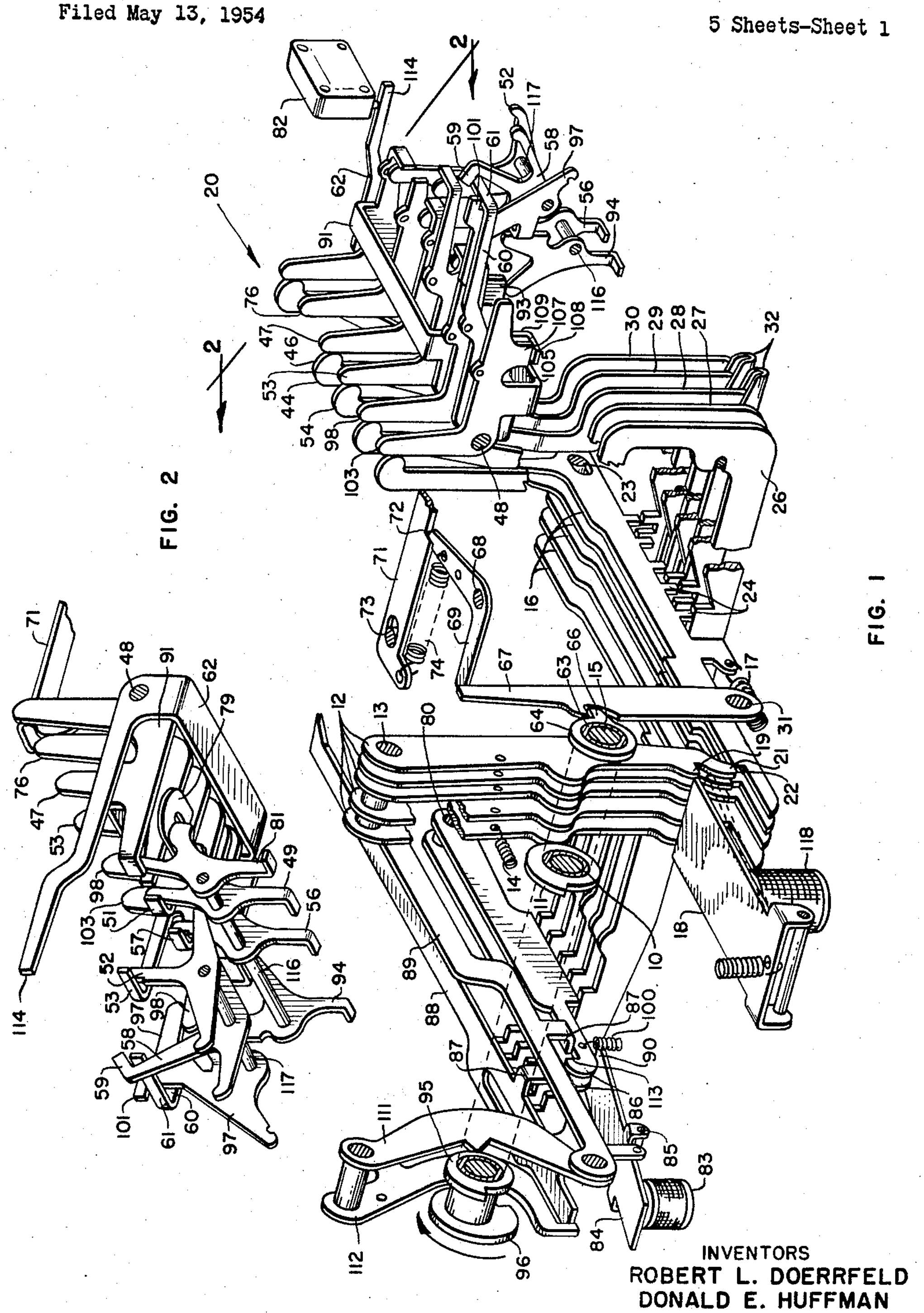
Fig. 1 shows a perspective view of the invention and associated part of a printing telegraph apparatus.
Fig. 2 shows a perspective view taken along lines 2—2 of Fig. 1 to more clearly illustrate the latching mechanism of this invention.
Figure 3:
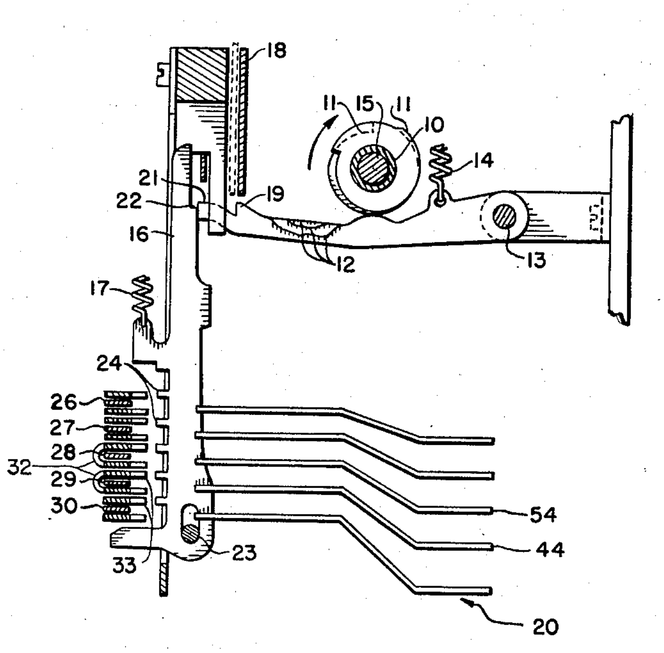
Fig. 3 shows the physical relationship of a cam sleeve, a selector lever, a push bar, and cooperating function bars of a portion of an apparatus embodying the principles of this invention.

Referring now to Figs. 1 and 3 there is shown a cam sleeve 10 having five selector cams 11 (only one cam shown) mounted thereon. Cooperating with the selector cams are a corresponding number of selector levers 12 each pivotally mounted upon a pin 13 and urged into engagement with their respective cams by the springs 14. The foregoing elements are of substantially the same structure and operation as corresponding elements disclosed in United States Patent No. 2,339,313, issued on January 18, 1944, to W. J. Zenner. Each of five push bars 16 slidably mounted in a manner similar to the mounting disclosed in said Zenner patent, are urged towards corresponding selector levers 12 by springs 17. An armature 18 assumes a "spacing" position (in line with lugs 19 formed on each selector lever 12) or a "marking" position (dotted line position shown in Fig. 3) in response to the energization or de-energization of a selector magnet (not shown in Fig. 3) controlled by the marking and spacing impulses of a telegraph signal in a manner well known in the printing telegraph art. The selector cams 11 are spaced apart on the sleeve 10 and are so positioned angularly with respect to one another that the selector levers "drop in" or move towards their respective cams sequentially as the cams rotate in the direction shown and in synchronism with the receipt of telegraph signals. A push bar 16 assumes a mark position, (lowermost position), whenever its corresponding selector lever is permitted to follow its cam thus allowing the tip 21 of the selector lever to engage the shoulder 22 of the push bar. A push bar assumes a marking position when a marking impulse is received by the selector magnet 118 causing the armature 18 to assume the dotted line position, clear of lug 19, as shown in Fig. 3. Thus, after a selector lever 12 drops in and its tip 21 engages the shoulder 22 of its mating push bar, continued rotation of the cam 11 associated with the lever will drive the push bar downwardly (Fig. 3) to its marking position against the pin 23.

When the armature 18 is in the spacing position the levers 12 are prevented from following their cams and the tips 21 thereof will not engage the shoulders 22 and the associated push bars will remain in their uppermost or spacing positions (Fig. 3) in response to the urging of the springs 17.

As is well known, the rotation of the selector shaft 15 is synchronous with the telegraph signal impressed on the selector magnet so that upon each revolution of the selector shaft 15 the push bars 16 are positioned permutatively under the control of the selector armature 18.

The push bars 16 of the present invention are substantially the same as those shown in said Zenner patent and are formed with uniformly spaced projections 24. Function bars 26, 27, 38, 29 and 30, disposed transversely of the push bars (plan view shown in Fig. 11), and having coded wards mounted thereon are engageable with, or selectable by the push bars in the manner described in the cited Zenner patent. Note that in the Zenner patent the projections integral with the push bars are coded and that the function bars have uniformly spaced projections while in the present invention the reverse is true.

Figure 11:
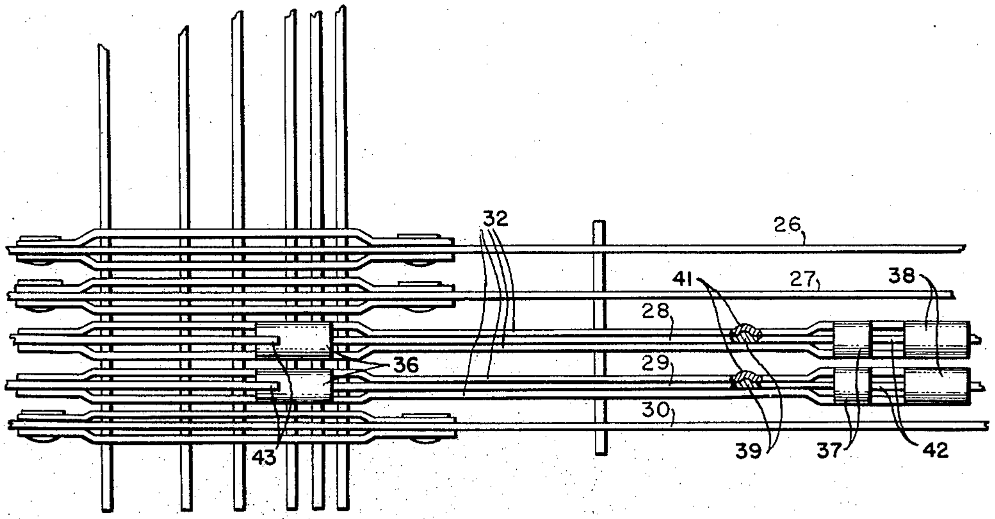
Fig. 11 shows the disposition of the five push bars and the five function bars.

The coded wards associated with function bars 26, 27, and 30 are integral with straps 32 riveted in pairs to the respective function bars as is apparent in Fig. 11. The straps 32 associated with function bars 28 and 29 are removable and are otherwise similar to the riveted straps. Wards 33 associated with function bars 28 and 29 have a weakened section at 34 (Fig. 5) so that they may be readily removed by several flexures thus coding the wards and making it possible to render a particular function bar selectable by a particular permutative setting of the push bars. For example, assume that whenever the permutative setting of the push bars 16 corresponds to the telegraph signal designating the letter "A," one is desirous of having the function bar 28 selected. To do this the strap 32 associated with the function bar 28 is coded by removing certain wards so that the bar is free to pivot clockwise (Figs. 1 and 5) and be selected whenever the "A" permutation develops. For a particular function bar to be selected in response to a particular permutative setting of the push bars 16, the upper wards opposite the projections 24 of those push bars 16 which are in a spacing position must be removed while the lower wards opposite the projections 24 of those push bars 16 which are in the marking position must be removed.

As will be more apparent later it is frequently desirable to change the coded wards associated with certain the function bars thereby making certain function bars selectable in accordance with a particular permutative setting of the push bars for a certain interval of time and selectable in accordance with another permutative setting of the push bars at another interval.

Accordingly, the straps 32 associated with the function bars 28 and 29 are removable. The removable straps have a U-shaped cross section at points indicated generally by the reference numerals 36, 37, and 38 (Fig. 11). The removable straps are held by the engagement of pimples 39 formed on the function bars and recesses 41 formed on the straps (Fig. 11). These straps are positioned with respect to the function bars by the guide pins 42 and ears 43 (Fig. 5).

In the present embodiment of the invention the straps 32 associated with function bar 26 have been coded to bring about the selection of bar 26 in response to a permutation of push bars 16 corresponding to the blank signal. Correspondingly the function bar 27 is selected by the carriage return signal, and the function bar 30 responds to the figures or the letters signal. The function bar 28 which carries a removable strap 32 is coded in a manner which permits this bar to be selected in response to a permutative setting of the push bars 16 denoting a particular alphabet character such as the character A and is known as the second call function bar. Correspondingly the function bar 29 is coded so as to recognize another permutative setting of the push bars 16 corresponding to a predetermined alphabet character such as the character B and is known as the first call function bar. Obviously, the function bars 28 and 29 by virtue of their carrying removable coded wards can be rendered responsive to any desired pair of alphabet or other characters. A particular feature, then, of the removable straps is that they provide a means for continually changing the particular telegraph signal to which function bars 28 and 29 are responsive.

In the present invention a remote printing telegraph apparatus is assigned a pair of call letters, for example AB, by affixing to its function levers 28 and 29 a pair of removable straps 32 having wards coded in a manner which permits these function levers to be selected in response to the telegraph signals corresponding to the alphabet characters A and B. Recognition by a remote printing telegraph apparatus of its assigned call letters will place that apparatus in condition for operation in response to intelligence transmitted from any other apparatus of the system.

Figures 5, 6:
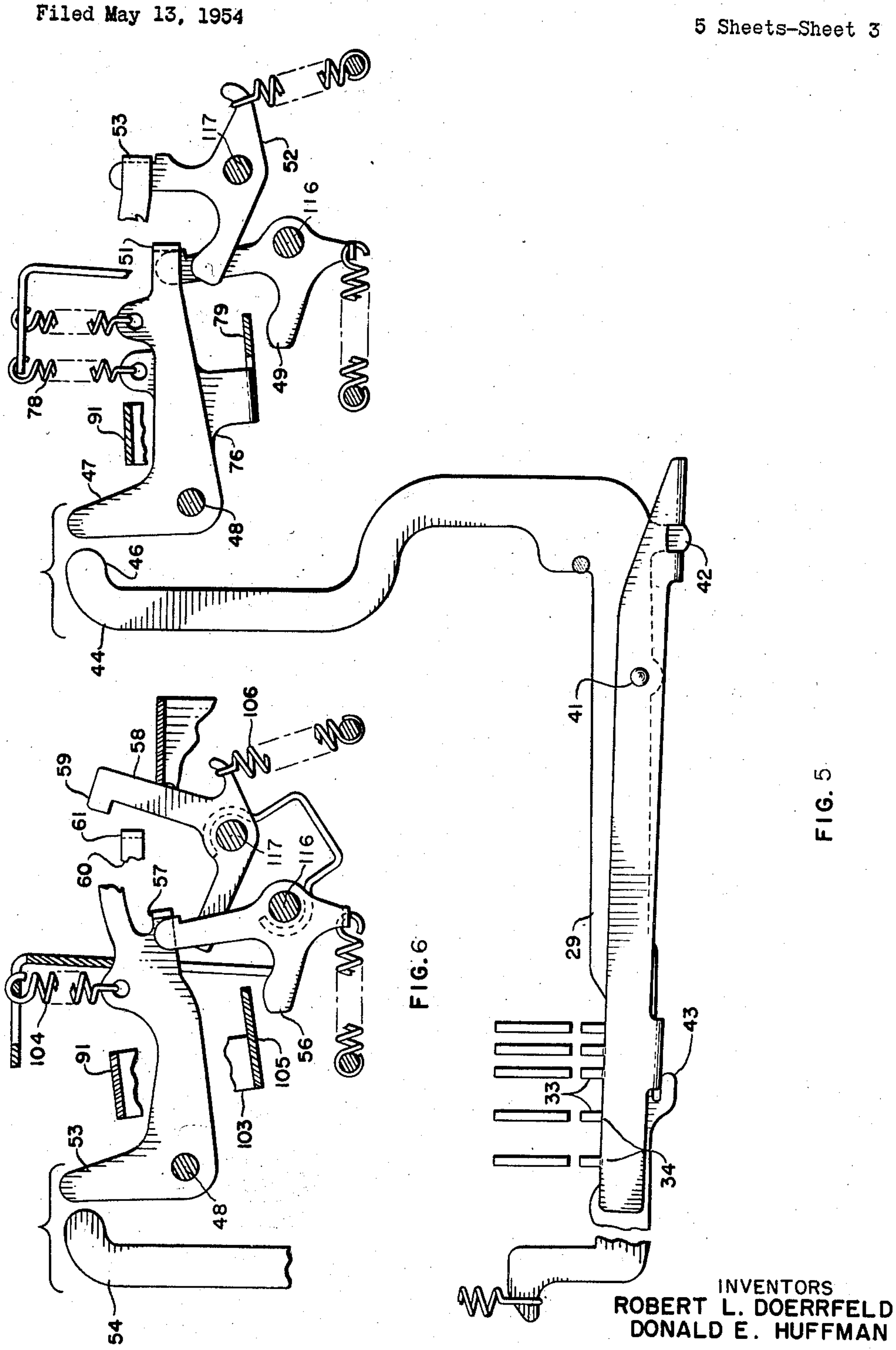
Fig. 5 is a plan view of the first call function bar, its extension, the first call lever and its associated latches.
Fig. 6 shows a plan view of the second call function bar extension, the second call lever and associated latch.

The first call function bar 29 shown in elevation in Fig. 5 is typical of the function bars 26, 27, 28 and 30.

Figure 4:
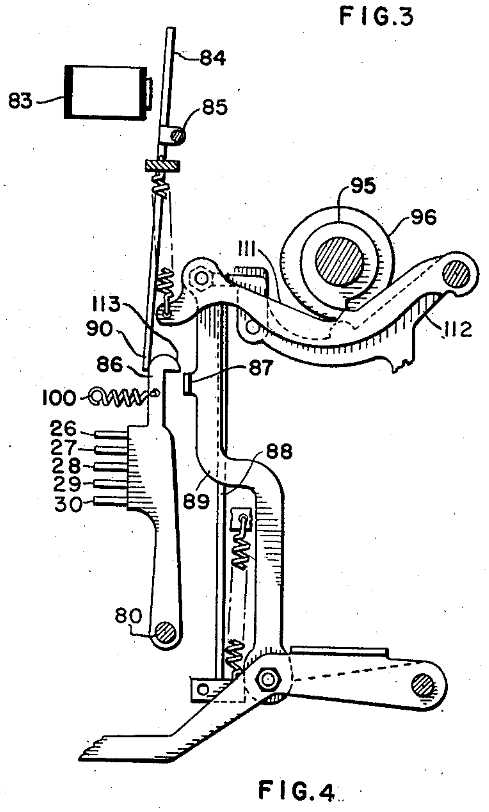
Fig. 4 shows the disposition of the printing and spacing cams and levers, the printing and spacing push bars, and the suppressor levers with respect to the cam sleeve of Fig. 1.

All function bars are mounted and operate in substantially the same manner as described in said patent to Zenner with the exception that each is provided with an extension having a configuration corresponding to the extension 44 (Fig. 5) integral with the first call bar 29. The extensions (shown generally at 20, Figs. 1 and 3) are utilized in conjunction with various latches and levers (Fig. 2) to permit or prevent the operation of a suppressor switch 82 which when closed energizes a magnet 83 (Figs. 1 and 4) whose armature 84 in turn pulls up to suppress the printing and spacing operations of a telegraph receiver, thus disabling the receiver. Each of the function bars performs a particular task such as conditioning the suppressor switch for operation, restoring the switch to its normal condition or locking the switch in the operated or unoperated position.

As seen in Figs. 1, 2 and 5, selection of the first call function bar 29 will cause the bar to rotate clockwise causing the lobe 46 of the extension 44 to engage and rotate first call lever 47 in a clockwise direction about a rod 48 until it is latched in its operated position by the engagement of a lateral extension 51 thereof and a latch 49. During the course of the rotation of the first call lever 47 it engages and rotates a blocking lever 52 on the shaft 117 in a counterclockwise direction clear of a second call lever 53.

Referring now to Figs. 1, 2 and 6, selection of second call function bar will cause its extension 54 to move to the right to engage and rotate second call lever 53 in a clockwise direction until it is latched in its selected position by the engagement of a lateral projection 57 thereof and a latch 56. During the course of travel of the second call lever 53, a switch blocking lever 58 is encountered and is rotated counterclockwise on shaft 117 until a projection 59 thereof assumes a blocking position with respect to a lateral projection 61 extending from an arm 60 of a U-shaped switch operating lever 62.

Figure 9:
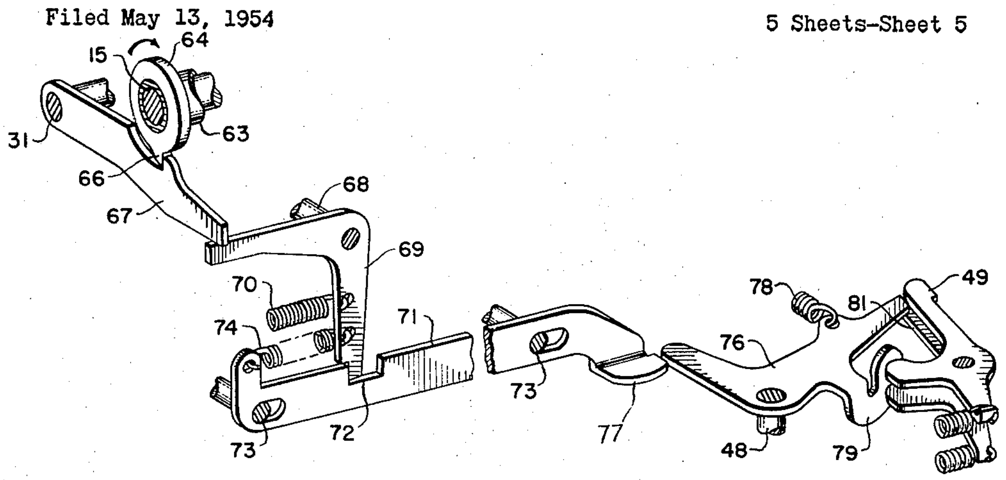
Fig. 9 shows the figures lever and first call lever release mechanism.

A release mechanism, shown in detail in Fig. 9, is provided for restoring the first call lever 47 to its normal or unoperated condition simultaneous with the receipt of the next telegraph signal. Referring now to Figs. 1, 2 and 9, there is shown a portion of a function cam sleeve 63 mounted on the shaft 15. The function cam sleeve of the present invention is substantially the same as that shown in said Zenner patent. Secured to the sleeve 63 is a release cam 64 having a lobe 66. The release cam completes one revolution during the interval in which a telegraph signal is received. A release cam follower 67 is disposed parallel to the selector levers 12 and is pivotally mounted on a pin 31. Mounted on a rod 68 and urged into engagement with the follower 67 by spring 70 (Fig. 9) is a bell crank 69. Slide bar 71 having a notch 72 for receiving the vertical arm of the bell crank 69 is slidable transversely on the pins 73. The bell crank 69 and the slide bar 71 are urged into engagement by a spring 74. Pivotally mounted on the vertical rod 48 is a release lever 76 (Figs. 2 and 9) urged into engagement with a lateral projection 77 of the slide bar 71 by a spring 78.

Rotation of the release cam 64 in the direction shown in Figs. 1 and 9 will drive the follower 67 downwardly thereby rotating the bell crank counterclockwise. As the bell crank rotates, slide bar 71 is driven to the right. This lateral motion drives the release lever 76 in a clockwise direction until the projection 79 thereof engages and releases the latch 49 thereby releasing the first call lever 47. As will be described hereinafter a similar latch 81 may also be released by the action of the release lever 76 thereby releasing a figures lever 91.

It is to be noted that the operation of the release cam 64 is so timed with respect to the operation of the function bars 28 and 29 that the second call lever 53 is operated before the first call lever 47 is released. Since the function cam sleeve 63 and release cam 64 make one revolution for each character received, the first call lever 47 is always released by the next signal received. Thus it is apparent that in order to select a particular apparatus, its call letters must be transmitted in sequence.

It is to be noted that in the event the second call letter of one apparatus is the same as the first call letter assigned to another, means must be provided for releasing the first call lever of said other apparatus. This release is accomplished by the simple expedient of transmitting the space signal after transmitting the call letters of a particular station. The space signal inherently involves a revolution of the function cam sleeve which in turn operates the release cam in the manner just described causing the release lever 76 to unlatch the first call lever 47 of said second receiver.

After all remote apparatuses desired have been selected by the sequential transmission of their respective first and second call letters, those apparatuses are now conditioned for the reception of further signals. The condition is established by locking the switch operating lever 62 in a rotated position so that its extension 114 is clear of a switch 82 as will be described more completely hereinafter. Closure of a switch 82 energizes a suppressor magnet 83 (Figs. 1 and 4) causing an armature 84 to be attracted and rotated about a pin 85. Rotation of the armature 84 in a counterclockwise direction causes the tip 90 thereof to engage and move two latches 86 pivotally mounted on a pin 80 into engagement with two lugs 87. One lug 87 is integral with a spacing push bar 88 and the other lug 87 is integral with a printing push bar 89 which are operated by the printing cam 95 and the spacing cam 96 respectively through the cam followers 111 and 112. The printing push bar 89 and the spacing push bar 88 have the same function as similar bars in said Zenner patent. Obviously, movement of the latches 86 into the reciprocatory path of the push bars 88 and 89 will cause the lips 113 of the latches 86 to engage the lugs 87, thereby restricting the upward movement of the push bars 88 and 89, thus suppressing the printing and spacing functions. Spring 100 is provided to urge the latches 86 out of engagement with the lugs after the suppressor magnet is de-energized.

Figure 7:
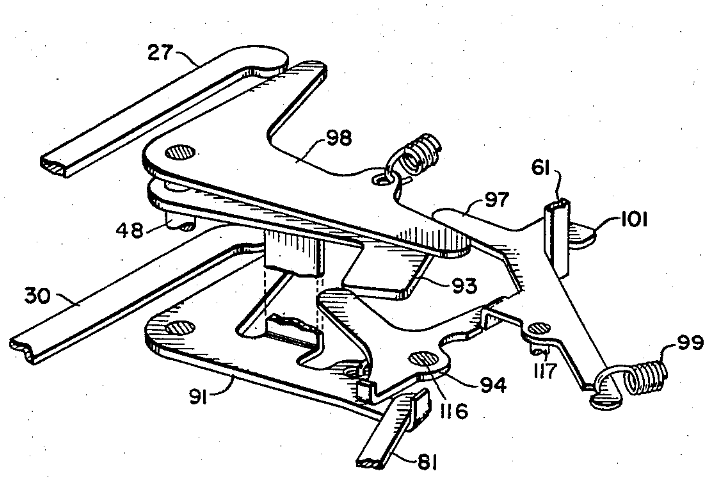
Fig. 7 shows the carriage return and figures function bar extensions as well as their respective levers and latches.

Referring now to Figs. 1 and 2, the mechanism (shown in detail in Figs. 7 and 8) for freeing the switch operating lever 62 for operation so as to close the switch 82 and thereby suppress printing and spacing in the manner just described will now be undertaken. Transmission of the signal corresponding to figures will cause function bar 30 to be selected. The selection of this bar will cause the figures lever 91 to rotate counterclockwise (Fig. 2) to its latched position, being so held by the latch 81 on shaft 116. During the course of the movement of the lever 91, a depending portion 93 (Fig. 1) thereof engages and rotates a blocking lever 94 clear of lever 97. Immediately following the transmission of the figures signal, the carriage return signal is transmitted. Reception of this signal will cause the carriage return function bar 27 to be operated in the same manner as the function bar 30. The selection of the carriage return function bar 27 rotates the carriage return lever 98 clockwise (Figs. 1 and 7). As the lever 98 rotates clockwise the lever 97 will follow in response to the urging of a spring 99 until a projection 101 integral with the lever 97 is rotated clear of the lateral projection 61 extending from the arm 60 of the switch operating lever 62. Switch operating lever 62 is now free to rotate clockwise (Fig. 2) about shaft 48 to present its extension 114 to the switch 82, thereby closing the printing and spacing suppression switch 82. It is to be noted that at selected apparatuses, the switch operating lever 62 will move clockwise (Fig. 2) until blocked by the projection 59 of the switch blocking operating lever 58, thus precluding closure of the printing and spacing switch at those apparatuses. Accordingly on the selected apparatuses the switch 82 remains open and the receivers will continue to print and to space in response to signals received and at the non-selected apparatuses the printing and spacing operations will be suppressed in the manner previously described.

Transmission of the carriage return signal immediately following the figures-signal brings about the release of the figures lever 91 by the engagement of the projection 79 of the release lever 76 with the latch 81 in the same manner as the first call lever 47 is released by the latch 49.

Figure 8:
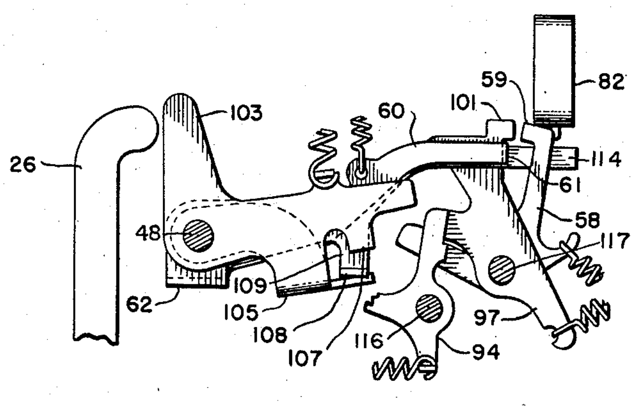
Fig. 8 shows the blank function bar extension, the blank lever, the suppressor switch and the associated switch operating lever.
Figure 10:
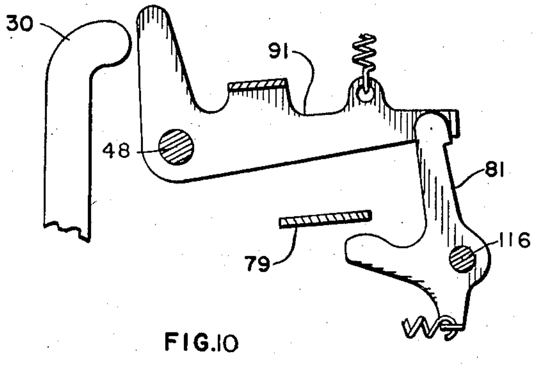
Fig. 10 shows the relationship between the release lever and the figures latch.

After one has transmitted to the selected apparatuses all the intelligence that the selected apparatuses are to receive, it is necessary to restore the levers 58 and 97 to their normal position (as shown in Fig. 8), that is to say, means are necessary for returning all apparatuses within a given system to their normal condition.

Accordingly, the function bar 26 which responds to the telegraph signal known as blank and referred to hereinafter as the blank function bar is utilized to restore selected and non-selected apparatuses or stations to their normal condition. Selection of the blank function bar 26 will cause the blank lever 103 to pivot clockwise (Figs. 1 and 8) causing a portion 105 thereof to engage the second call lever latch 56 (Fig. 6) rotating it counterclockwise, thus releasing the second call lever 53. As the second call lever 53 returns to its unoperated position in response to spring 104, the lateral projection 57 thereof is lifted clear of the switch blocking lever 58. The lever 58 returns, then, to its unoperated position in response to the urging of spring 106.

Note that as the blank lever 103 rotates in response to the selection of the blank function lever 26, a portion 107 thereof engages a lateral projection 108 of depending arm 109 integral with switch operating lever 62. The lever 62 is thus rotated clockwise (Fig. 1) until latched in its unoperated position by cooperation of its lateral extension 61 with the extension 101 of the latch 97. In this manner the selection of the blank function bar 26 operates to restore all receivers of a system to their normal condition and all receivers are thereby placed in condition to be selected by the transmission of appropriate call letters from any station of the system.

Referring once more to Figs. 1 and 4, it will be recalled that the on-selected stations, by means of the present invention, are rendered inoperative by suppressing the printing and spacing functions thereof and at those non-selected stations the suppressor switch associated with each non-selected apparatus is permitted to close, energizing a magnet 83 to cause the armature 84 to respond by moving into a locking position (dotted line position of the armature 84 in Fig. 4) with respect to a printing push bar 89 and a spacing push bar 88. The normal reciprocatory motion of these two elements is thereby arrested, thus rendering non-selected receivers non-responsive to telegraph signals.

The disclosed embodiment of the present invention, as illustrated in Figs. 1 and 2, operates in the following fashion: Assume that a particular printing telegraph apparatus of a system or network of such apparatus is assigned the call letters AB by placing upon the function bears 28 and 29 thereof a pair of removable straps 32 coded so as to permit these bars to be selected sequentially in response to the receipt from any other apparatus of the system telegraph signals corresponding to the characters A and B. Assume further that another printing telegraph apparatus station of the network has been assigned the call letters BC in a similar manner. Assume still further that one is desirous of transmitting to the apparatus AB only.

The first signal transmitted is always the blank signal which initiates the selection of the blank function 26. The blank function bar 26 will operate blank lever 103 to clear all apparatuses of the network of any previous selections. As previously described (shown in detail in Fig. 8) a depending arm 107 of the lever 103 strikes a projection 108 of switch operating lever 62 moving the lever 62 downwardly until latched by lever 97. Correspondingly the portion 105 of the lever 103 engages and trips the latch 56 thus releasing second call lever 63 which in turn releases the blocking lever 58.

The first call letter A is next transmitted and is recognized by apparatus AB by latching first call lever 47 in the operated position and freeing the second call lever 53 for operation. Transmission of the signal B immediately follows and is recognized by the apparatus AB by operating the second call lever 53 in a manner previously described causing blocking lever 58 to rotate counterclockwise (Figs. 1 and 6) to block switch operating lever 62.

It is to be noted that the second call letter assigned to apparatus AB, namely the leter B, is also the first call letter of apparatus BC. Accordingly, the apparatus BC will recognize the letter B and respond thereto by latching its first call lever in the operated position. Since one is desirous of transmitting intelligence to apparatus AB only, transmission of the space signal immediately following the transmission of the letters AB will operate the release mechanism (shown in detail in Fig. 9) in the manner previously described and will result in the return of the first call lever 47 of apparatus BC to the unoperated position. The figures signal is next transmitted and is recognized by both AB and BC operating figures lever 91. Operation of the figures lever 91 unlatches blocking lever 97 in the manner previously described. Following the figures signal the carriage return signal is transmitted which brings about the selection at both apparatuses of the function bar 27. This selection results in the operation of the carriage return lever 98 which acts to permit the blocking lever 97 to be rotated clear of the arm 61 of switch operating lever 62.

At apparatus AB, switch operating lever 62 will now be free to rotate clockwise (Fig. 2) in response to its return spring, but will be restrained from closing the switch 82 by the blocking lever 58 (now operated). Accordingly, apparatus AB will remain free to print and space in response to further signals transmitted, however, at apparatus BC the switch operating lever 62 will be free to rotate through an angle sufficient to operate the switch 82. As previously described, operation of the switch 82 will energize the suppressor magnet 83 whose armature 84 will pull up. The motion of the armature 84 will of course move the heads of the suppressor levers 86 to the right thus blocking the reciprocatory motion of the printing and spacing push bars 88 and 89, respectively. It is to be understood that apparatus AB is thus conditioned for operation in response to telegraph signals transmitted while apparatus BC will not be responsive since its printing and spacing functions are suppressed. These two apparatuses as well as any other selected or non-selected stations of the system will remain in their selected or non-selected condition so long as the blank signal is not again transmitted (transmission of the blank signal will place all apparatuses of the system in condition for operation).

In the event that one is desirous of calling all apparatuses of a network simultaneously without having to follow the time consuming task of calling each apparatus individually by transmitting its particular call letters the blank or general call signal alone is transmitted. Reception of the blank signal by all apparatuses of the network places all apparatus in condition for the reception of a message. The only precaution necessary after transmitting the general call signal is that the figures and carriage return signals must not be transmitted in sequence and thereafter. It is obvious that transmission of the figures and carriage return signal in sequence immediately following the blank or general call signal would operate to suppress printing and spacing at all apparatuses.

It is to be understood that the above described arrangement of the selecting device is simply illustrative of the application of the principles of the invention and many other modifications may be made without departing from the invention.

What is claimed is:

1. In a selecting device for a printing telegraph apparatus, a normally open switch, a lever for actuating said switch, means for urging said lever in a direction to close said switch, a first normally operated latch operable to hold said lever in the open position, a second normally unoperated latch adapted to be moved into position to hold said lever in the open position, a plurality of selectable elements, means responsive to a pair of signals for sequentially selecting a pair of elements, means actuated by the selection of the first element of said pair of elements for conditioning said second latch for operation, means actuated by the sequential selection of the second element of said pair of elements for operating said second latch, and means responsive to a single predetermined signal for nullifying the effect of the selection of said first element in the event said second element is not sequentially selected.

2. In a selecting device for a printing telegraph apparatus, a normally open switch, a lever for actuating said switch, means for urging said lever in a direction to close said switch, a first normally operated latch operable to hold said lever in the open position, a second normally unoperated latch operable to hold said lever in the open position, a plurality of selectable elements, means responsive to a first pair of signals for sequentially selecting a first pair of elements, means actuated by the selection of the first element of said first pair of elements for conditioning said second latch for operation, means responsive to a second pair of signals for sequentially selecting a second pair of elements, means actuated by the selection of the first element of said second pair of elements for conditioning said first latch for unlatching, and means for restoring the conditioned latches to their unconditioned state.

3. In a selecting device for a printing telegraph apparatus, a normally open switch, a lever for actuating said switch, means for urging said lever in a direction to close said switch, a first normally operated latch operable to hold said lever in the open position, a second normally unoperated latch adapted to be moved into position to hold said lever in the open position, a plurality of selectable elements, means responsive to a first pair of signals for sequentially selecting a first pair of elements, means actuated by the selection of said first pair of elements for moving said second latch to the latched position, means responsive to a second pair of signals for sequentially selecting a second pair of elements, means actuated by the selection of said second pair of elements for moving said first latch to the unlatched position, means responsive to a predetermined signal for selecting a fifth selectable element and means actuated by the selection of said fifth element for returning both said latches to their normal positions.

4. In a selecting device for a printnig telegraph apparatus having normally operative printing and spacing means, the combination of means for blocking operation of said spacing and printing means, with a lever for rendering said blocking means operative, means for urging said lever into an operative position to render said blocking means operative, a first normally operated latch operable to hold said lever out of said position, a second normally unoperated latch arranged to be moved into position to hold said lever out of its operative position, a plurality of selectable elements, means responsive to a pair of signals for sequentially selecting a pair of said elements, means actuated by the selection of said first element of said pair of elements for conditioning said second latch for operation, means actuated by the sequential selection of the second element of said pair of elements for operating said second latch, and means responsive to a single predetermined signal for nullifying the effect of the selection of said first element in the event that said second element is not sequentially selected.

References Cited in the file of this patent

UNITED STATES PATENTS

| | | |
|---|---|---|
| 2,096,145 | Swezey | Oct. 19, 1937 |
| 2,106,805 | Lang | Feb. 1, 1938 |
| 2,666,095 | Zenner | Jan. 12, 1954 |
| 2,708,216 | Doerrfeld | May 10, 1955 |
| 2,728,811 | Gemmel | Dec. 27, 1955 |
| 2,728,905 | Eklund | Dec. 27, 1955 |